United States Patent
Morone et al.

(10) Patent No.: US 12,031,081 B2
(45) Date of Patent: Jul. 9, 2024

(54) NON-FLAMMABLE HYPOPHOSPHITE METAL SALT BASED POWDERS AND THEIR USE AS FLAME RETARDANT INGREDIENTS

(71) Applicant: Italmatch Chemicals S.p.A., Arese (IT)

(72) Inventors: Vincenza Morone, Arese (IT); Ugo Zucchelli, Arese (IT)

(73) Assignee: ITALMATCH CHEMICALS S.P.A., Arese (IT)

(*) Notice: Subject to any disclaimer, the term of this patent is extended or adjusted under 35 U.S.C. 154(b) by 99 days.

(21) Appl. No.: 17/600,214

(22) PCT Filed: Apr. 2, 2019

(86) PCT No.: PCT/IB2019/052686
§ 371 (c)(1),
(2) Date: Sep. 30, 2021

(87) PCT Pub. No.: WO2020/201811
PCT Pub. Date: Oct. 8, 2020

(65) Prior Publication Data
US 2022/0220384 A1     Jul. 14, 2022

(51) Int. Cl.
*C09K 21/04* (2006.01)
*C08K 3/32* (2006.01)
*C08K 5/5313* (2006.01)
*C08K 5/5333* (2006.01)
*C09K 21/12* (2006.01)

(52) U.S. Cl.
CPC ............. *C09K 21/04* (2013.01); *C08K 3/32* (2013.01); *C08K 5/5313* (2013.01); *C08K 5/5333* (2013.01); *C09K 21/12* (2013.01); *C08K 2003/325* (2013.01); *C08K 2003/327* (2013.01)

(58) Field of Classification Search
CPC .......... C09K 21/04; C09K 21/12; C08K 3/32; C08K 5/5313; C08K 5/5333
See application file for complete search history.

(56) References Cited

U.S. PATENT DOCUMENTS

| | | | |
|---|---|---|---|
| 2014/0336325 A1* | 11/2014 | Bauer | C09K 21/04 252/607 |
| 2015/0218347 A1 | 8/2015 | Zheng et al. | |
| 2016/0304715 A1 | 10/2016 | Zucchelli | |

FOREIGN PATENT DOCUMENTS

| | | |
|---|---|---|
| CA | 2641112 | 6/1999 |
| DE | 19919232 | 7/2000 |
| EP | 0006568 | 1/1980 |
| EP | 0699708 | 3/1996 |
| EP | 1016623 | 7/2000 |
| WO | 2005044906 | 5/2005 |
| WO | 2005075566 | 8/2005 |
| WO | 2005121232 | 12/2005 |
| WO | 2007010318 | 1/2007 |
| WO | 2009010812 | 1/2009 |
| WO | 2011163207 | 12/2011 |
| WO | 2012045514 | 4/2012 |
| WO | 2014013284 | 7/2012 |
| WO | 2012168746 | 12/2012 |
| WO | 2013045966 | 4/2013 |
| WO | 2013083247 | 6/2013 |
| WO | 20130832428 | 6/2013 |
| WO | 2014121804 | 8/2014 |
| WO | 2015087099 | 6/2015 |
| WO | 2015113740 | 8/2015 |
| WO | 2015170130 | 11/2015 |
| WO | 2018073818 | 4/2018 |
| WO | 2018073819 | 4/2018 |
| WO | 2018178983 | 10/2018 |
| WO | 2018178985 | 10/2018 |

OTHER PUBLICATIONS

International Search report and written opinion issued by the EPO on Dec. 10, 2019 for PCT/IB2019/052686.
N V Romanova and N V Demidenko, "Hypophosphorous Acid Acid and Its Salts" 1975 The Chemical Society and The British Library.
Pavel Karen*, Patrick McArdle and Josef Takats, "Comprehensive definition of oxidation state (IUPAC Recommendations 2016)" De Gruyter, Pure Appl. Chem. 2016; 88(8): 831-839.

* cited by examiner

Primary Examiner — John E Uselding
(74) Attorney, Agent, or Firm — Silvia Salvadori

(57) ABSTRACT

Hypophosphorous acid metal salts powders and non-flammable inorganic or organic aluminum salt of phosphorous are used as flame retardant agents in flame retarded compositions suitable for polymer materials.

3 Claims, No Drawings

NON-FLAMMABLE HYPOPHOSPHITE METAL SALT BASED POWDERS AND THEIR USE AS FLAME RETARDANT INGREDIENTS

This application is a U.S. national stage of PCT/IB2019/052686 filed on 2 Apr. 2019 the content of which is incorporated herein by reference in its entirety.

BACKGROUND OF THE INVENTION

The chemical structure and the technical characteristics of organic polymers make them easily combustible. A wide variety of flame retardant additives is blend into those organic polymers that are processed to become plastic materials, to achieve stringent standards demanded by their final utilizations and even by national and/or international legislations.

Many excellent known flame retardant agents are represented by organic or inorganic phosphorus-containing compounds, in which the phosphorus atom has an oxidation state ranging from −3 to +5. A definition of the term "oxidation state" has been, for example, published by Karen, P.; McArdle, P.; Takats, J. (2016). "Comprehensive definition of oxidation state (IUPAC Recommendations 2016)". *Pure Appl. Chem.* 88: 831-839.

Phosphorus-containing compounds of oxidation state ranging from −3 to +5, are derived from phosphine $PH_3$ (where P oxidation state is −3), phosphine oxide $H_3PO$ (where P oxidation state is −1), elementary phosphorus $P_4$ (where P oxidation state is 0), hypophosphorous acid $H_3PO_2$ (where P oxidation state is +1), phosphorous acid $H_3PO_3$ (where P oxidation state is +3) and phosphoric acid $H_3PO_4$ (where P oxidation state is +5).

Independently from the oxidation state, organic phosphorus compounds are less convenient and more difficult to produce than inorganic phosphorus compounds, also because inorganic phosphorus compounds represent the raw materials commonly used for organic phosphorus compounds synthesis.

Phosphine is the compound where phosphorus is present in its lower oxidation state (−3). Phosphine is an inorganic compound having the chemical formula $PH_3$. $PH_3$ is a colorless, flammable, toxic gas effective as flame inhibitor, but impossible to be used as such, as flame retardant agent. Examples of organic phosphorus compounds, belonging to phosphine class and related to phosphine, characterized by P oxidation state −3, are aromatic phosphines.

Phosphorus compounds where P is present in oxidation state −1 are related to phosphine oxide $H_3PO$. Inorganic compound phosphine oxide ($H_3PO$) is unstable. Examples of organic phosphine oxides, characterized by P oxidation state −1, are triphenylphosphine oxide, tritolylphosphine oxide, trisnonylphenylphosphine oxide, tricyclohexylphosphine oxide, tris(n-butyl)phosphine oxide, tris(n-hexyl) phosphine oxide, tris(n-octyl)phosphine oxide, tris(cyanoethyl)phosphine oxide, benzylbis(cyclohexyl)phosphine oxide, benzylbisphenylphosphine oxide, phenylbis(n-hexyl) phosphine oxide.

Phosphorus characterized by oxidation state 0 is elementary phosphorus. Examples are red and black phosphorus.

Phosphorus compounds where P oxidation state is +1 are related to hypophosphorous acid $H_3PO_2$. Examples of hypophosphorous acid salts (also known as hypophosphites or phosphinates), characterized by P oxidation state +1, are calcium hypophosphite and aluminium hypophosphite. Examples of organic hypophosphites or phosphinate metal salts, characterized by P oxidation state +1, are zinc aluminium diethyl phosphinate and aluminium diethyl phosphinate.

Phosphorus compounds where P oxidation state is +3 are related to phosphorous acid $H_3PO_3$. An example of inorganic phosphorous acid salts or phosphites, characterized by P oxidation state +3, is aluminium phosphite. An example of organic phosphite, characterized by P oxidation state +3, is triphenyl phosphite. An example of organic phosphonates, characterized by P oxidation state +3, is pentaerytritol-dimethyl phosphonate. An example of organic metal phosphonate, characterized by P oxidation state +3, is aluminium methyl methyl phosphonate.

Phosphorus compounds where P oxidation state is +5 are related to phosphoric acid $H_3PO_4$. Examples of phosphoric acid salts or phosphates, characterized by P oxidation state +5, are melamine phosphate or ammonium polyphosphate or melamine polyphosphate. Examples of organic phosphates, characterized by P oxidation state +5, are resorcinol bis dixylenyl phosphate and triphenyl phosphate.

P lower oxidation state compounds (−3, −1, 0, +1, +3) are generally more efficient as flame retardant agents than P higher oxidation state compounds, because the release of phosphorus-containing volatiles, which contribute to the extinction of the flame, decreases with increasing of phosphorus oxidation state.

Organic phosphine and organic phosphine oxide compounds (P oxidation state −3 and −1) are relatively low thermally stable and their synthesis are relatively complex. Organic phosphines and phosphine oxides found their main utilization as flame retardant agents in thermoset polymers like epoxy resins, unsaturated polyesters, polyurethanes.

Red phosphorous is one of the most important flame retardant agent for a wide range of polymeric materials, especially for oxygen containing polymers. The main drawback of red phosphorus when used as a flame retardant agent for polymeric materials is represented by its intrinsic dark color.

Hypophosphorus acid metal salts, also called inorganic metal phosphinates or metal hypophosphites (phosphorus oxidation state +1) have been reported as effective halogen free flame retardant additives for polymers.

Metal hypophosphites are characterized by the following chemical formula:

where:
"n" is an integer number ranging from 1 to 4 in dependence of the valence of the metal Me. The metal Me is any atom belonging to groups I, II, III and IV of the periodic table of the elements.

Sodium and Calcium hypophosphites are currently widely commercially available and they are normally produced by reacting the corresponding metal hydroxide on yellow phosphorus, for instance according to the following reaction scheme:

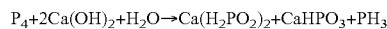

Hypophosphites of metals other than Calcium and Sodium are normally produced through the hypophosphorus acid reaction on the metal hydroxide or by exchange reaction with the corresponding soluble metal salts (see for instance "Hypophosphorus Acid and its salts, Russian Chemical Review, 44 (12), 1975).

Organic metal phosphinates (P oxidation state +1) are a new family of halogen free flame retardant agents, particularly efficient in polyamides and polyesters polymers, especially when used in association with a melamine containing product, the resulting mixture being more effective than organic metal phosphinates alone. These products, with particular regard to zinc and especially aluminium diethyl phosphinate, are currently commercially available under the "Exolit OP" brand.

This family of organic metal phosphinates was firstly described as flame retardant agents for example in EP 699708 and EP6568.

Different processes for the preparation of organic metal phosphinates are described, for instance in: CA 2641112, U.S. Pat. Nos. 6,300,516, 5,973,194, 601,172, DE 19910232, U.S. Pat. No. 6,090,968, EP 1016623, U.S. Pat. Nos. 6,329,544, 6,355,832, 6,359,171, 6,278,012, US 2003073865, US 2002079480, US 2006074157, US 2005137418.

An example of inorganic salt where P oxidation state is +3 is represented by Aluminium phosphite, that could be neutral or acid, and Aluminium phyrophosphate.

A particular form of Aluminium phosphite was recently described as a flame retardant synergic agent, for example according to WO2012/045414, WO2013/083247, WO2013/083248, WO2015/113740 and WO2013/0190432.

Organic metal phosphonates (P oxidation state +3) are also possible flame retardant agents. AMMP (Aluminium Methyl Methyl Phosphonate) is an example that is obtainable as described, for example, in WO2011/163207.

Organic phosphonates (P oxidation state +3) are also widely used as flame retardant agents. The use of a large number of diphosphonates as flame retardant agents in different polymers and copolymers is disclosed for example in U.S. Pat. No. 4,174,343.

Despite organic metal phosphinates, organic metal phosphonates and organic phosphonates are satisfactory in terms of overall performances, there is however a need for simpler compounds, that can be produced in easier and less expensive way and applied as such or as synergic components in association with other flame retardant agents in different formulations.

Thermoplastic flame retarded compositions, comprising hypophosphite free from halogens, in many polymers are known in the art.

Thermoplastic compositions comprising an hypophosphite as flame retardant agent and an aromatic polycarbonate resin, are described in the art, for example in WO2005/044906.

Thermoplastic compositions comprising a hypophosphite as flame retardant agent and a polyester resin are also described in the art, for example in WO2005/121232.

Thermoplastic compositions comprising a hypophosphite as flame retardant agent and thermoplastic polyamides are described in the art, for example in WO2005/075566, WO 2013/045966 and WO2015/087099.

A surface coated hypophosphite compound used as flame retardant agent in polymeric compositions, particularly thermoplastic polyesters or polyamides, is described in the art, for example in WO 2009/010812.

Thermoplastic compositions comprising an hypophosphite compound as flame retardant agent characterized by synergic effect in association with metal hydrates, used in thermoplastic polyolefins are described in WO 2014/121804.

Thermoplastic compositions comprising an hypophosphite compound as flame retardant agent characterized by synergic effect in association with an aromatic phosphorous ester, used in thermoplastic impact modified styrenic polymers, are described in WO 2015/170130.

Thermoplastic compositions comprising an hypophosphite compound and an halogen containing additive, being free from antimony trioxide, are also known in the art.

According to WO2007/010318, polyolefin polymers, particularly polypropylene polymers, are made flame retarded by incorporating a synergic mixture of an hypophosphite compound and an halogenated compound.

Thermoplastic polystyrene compositions comprising an hypophosphite compound and an halogenated compound, characterized by a very low halogen content in the final product, are described in the art, for example in WO2012/168746.

PVC flame retarded through the presence of an hypophosphorus acid metal salts, being free from antimony trioxide, is described in WO2014/013284. PVC is itself an halogen containing polymer.

Hypophosphorus acid metal salts useful as flame retardant agent being able to replace antimonium trioxide, are also known in the art.

A polyester composition, free from antimony trioxide, that is flame retarded using a mixture of calcium hypophosphite and a bromine containing polymer, is described in WO2018/073818.

A polyester composition, free from antimony trioxide, that is flame retarded using a mixture of aluminium hypophosphite and a bromine containing polymer, is described in WO2018/073819.

An impact modified styrene composition, free from antimony trioxide, that is flame retarded using a mixture of alkyl phosphinic acid metal salt with calcium or aluminium Hyphosphite and a bromine containing polymer, is described in WO2018/178983.

An impact modified styrene composition, free from antimony trioxide, that is flame retarded using a mixture of metal hypophosphite salt and a bromine containing polymer in an amount which is less than 28% by weight, is described in WO2018/178985.

Despite hypophosphite compounds are quite efficient in a large number of flame retardant formulations, there is a significant drawback when industrial practice is taken into consideration, because these compounds (hypophosphite compounds) are classified as dangerous materials due to their intrinsic flammability. Dangerous materials or hazardous compounds are solids, liquids, or gases that can harm people, other living organisms, property, or the environment. They are often subject to chemical regulations. In the United States, United Kingdom and often in Canada, dangerous materials are commonly known as hazardous materials (abbreviated as HAZMAT). Mitigating the risks associated with dealing with hazardous materials, may require the application of safety precautions during their transport, use, storage and disposal. Most countries regulate hazardous materials by law, and several international treaties regulate them as well.

The most widely applied regulatory scheme concerns transportation of dangerous materials. With the exception of certain dangerous materials, hazardous materials may, in general, be internationally transported in wheeled vehicles, if their packaging and labels are regulated and vehicles are specifically projected. Dangerous materials are divided in nine classes of hazard. Class 4.1 classifies flammable solids, for example solid substances that are easily ignited and readily combustible, like nitrocellulose, magnesium, safety or strike-anywhere matches. Transportation, stocking and handling of flammable solids is subject to several restrictions. According to the present invention, "flammable" means a readily combustible solid and "nonflammable"

means a solid substance that is not readily combustible when tested according United Nations publication "Recommendations on the Transport of Dangerous Good, Manual of Test and Criteria" (Sixth revised edition, 2015), Section 33—Division 4.1—Sub-section 33.2.1.4 Test N. 1: "Test method for readily combustible solids".

Dry hypophosphite compounds in powder form, for example aluminium or calcium hypophosphites, are classified as flammable solids and, for this reason, they are considered dangerous materials and often commercialized as:
1. Masterbatches in different polymers
2. Nonflammable flame retardant compositions, i.e. dry blend mixtures of two or more flame retardant components in association with synergic additives that are suitable for specific polymers and applications However, masterbatches increase costs and energy consumption and need different base polymers to fit different final plastic formulations.

On the other hand, it is relatively easy to obtain a nonflammable flame retardant composition with or without halogen.

For example, a flame retardant composition suitable for being used in impact modified styrenic thermoplastic compositions, is characterized by the presence of two flame retardant components, aluminium hypophosphite and Resorcinol bis (2,6-dixylenyl phosphate). This flame retardant composition can be defined as a nonflammable powder, as disclosed in WO 2015/170130. However, resorcinol bis (2,6-dixylenyl phosphate) cannot be used in engineering polymers like for instance polyamides.

The intimate mixing of specific halogenated additives with metal hypophosphites in powder form results in a nonflammable product, even at low halogen content. An example of nonflammable flame retardant composition containing halogens, is reported in WO2007/010318, where polyolefin polymers, particularly polypropylene polymers, are made flame retarded by incorporating a synergic mixture of an hypophosphite and a brominated compound. However, mixture of halogenated additives with metal hypophosphites cannot be used in halogen free compositions.

Recently, the utilization of hypophosphites in several complex flame retardant formulations is increasing and the number of dry blend mixtures characterized by different compositions is progressively increasing.

Consequently, there is the need of non-flammable hypophosphorus acid metal salts, in powder form, suitable to be used as an alternative ingredient with respect to flammable hypophosphorus acid metal salts, as flame retardant agent in flame retarded compositions.

Non-flammable hypophosphorus acid metal salts according to the present invention are mixed with at least a further additive that stabilizes the powder, reducing its tendency to burning according to the standard regulations of dangerous materials.

Replacing the pure flammable hypophosphorus acid metal salts with same quantity of non-flammable hypophosphorus acid metal salts, would result in the same flame retardant performances, according to international standard UL 94 "Flammability of plastic materials for parts in device and appliances" released By Underwriters Laboratories of United States, in formulations with or without halogen and in polymer bases.

Surprisingly such non-flammable hypophosphorus acid metal salts components are consituted by a mixtures of a major part of metal hypophosphites with a minor part of non-flammable organic or inorganic phosphorous metal salt (preferable aluminium) with oxidation state lower than +5.

The object of present invention is a non-flammable hypophosphite composition, in powder form, consisting of:
a) a major part of at least an hypophosphite metal salt
b) a minor part of at least a non-flammable inorganic or organic aluminium salt of phosphorus wherein phosphorous oxidation state is lower than +5.

The selection of the most appropriate hypophosphite depends from many critical factors.

Particularly, suitable hypophosphites metal salt, to be used according to above component a), must have sufficient thermal stability to overcome melt processing at temperature higher than about 200° C. If they do form hydrates, they must be used in the corresponding anhydrous form and they must not be hygroscopic when successively exposed to ambient humidity. Examples of such hypophosphites are: Aluminium hypophosphite (CAS 7784-22-7), Calcium hypophosphite (CAS 7789-79-9), Manganese hypophosphite (10043-84-2), Magnesium hypophosphite (CAS 10377-57-8), Zinc hypophosphite (CAS 15060-64-7), Barium hypophosphite (CAS 171258-64-3). Most preferred, according to the present invention, are Aluminium and Calcium hypophosphites.

Aluminium hypophosphite, corresponding to chemical formula $Al(H_2PO_2)_3$, is currently produced by Italmatch Chemicals Spa (under commercial name "Phoslite IP-A") in a white powder form with a low humidity level, high purity and different PSD suitable for thermoplastic processing.

Calcium hypophosphite, corresponding to chemical formula $Ca(H_2PO_2)_2$, is also currently produced by Italmatch Chemicals Spa (under commercial name "Phoslite IP-C").

The concentration range for hypophosphite metal salt (component a)) is from 80% to 95% and, most preferred, from 85% to 90% by weight with respect to the total weight of the non-flammable hypophosphite composition (components a)+b)).

Non-flammable inorganic or organic aluminium salt of phosphorus wherein phosphorous oxidation state is lower than +5 (component b), have the following general formulas:

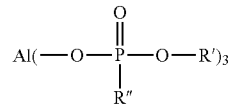

Formula I

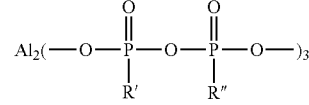

Formula II

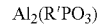

Formula III wherein R' and R" can be independently selected as:
H, linear or branched $C_1$-$C_6$ alkyl, aryl or substituted aryl

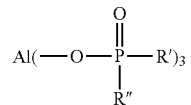

Formula IV wherein R' and R" are independently selected as:
linear or branched C1-C6 alkyl, aryl or substituted aryl Examples of compounds belonging to formula I are Aluminium Methyl Methyl Phosphonate and Acidic Aluminium Phosphite. An example of compound belonging to formula II is Aluminium Pyrophosphate, an example of compound belonging to formula III is Neutral Aluminium Phosphite. An example of compound belonging to formula IV is Aluminium di Ethyl Phosphinate.

The concentration range of non-flammable inorganic or organic aluminium salt of phosphorus where P oxidation state is lower than +5 is from 20% to 5% and most preferred from 15% to 10% by weight, with respect to the total weight of the non-flammable hypophosphite composition (components a)+b)). They can be used alone or in mixtures.

Adding a relatively low quantity of non-flammable organic or inorganic aluminium metal salt to flammable hypophosphorous metal salt is extremely effective in stabilizing the powder against flame, according to standard regulations on dangerous materials.

Very likely this surprising effect is due to the formation under flame of a thin non-flammable char layer, not permeable to oxygen, that stops flame propagation.

Moreover, the flame retardant efficiency of the composition is substantially unaffected.

The powder composition is made adding components a) and b) separately milled in powder form in a slow mechanical mixer or into an high speed mechanical mixer. Optionally, the two components are first mixed and then jointly grinded to perform grinding in one step.

Alternatively, components a) and b) are suspended in a liquid, preferable water, followed by filtering, drying and milling the filtered product.

EXPERIMENTAL PART

Test Method for Flammable Solids

Test conditions are according United Nations Recommendations on the Transport of Dangerous Good, Manual of Test and Criteria" (Sixth revised edition, 2015), Section 33—Division 4.1—Sub-section 33.2.1.4 Test N. 1: "Test method for readily combustible solids". The ability of a substance to propagate combustion is tested by igniting it and determining the burning time. Basically, powder are loosely filled into a mold 250 mm long with a triangular cross-section of inner height 10 mm and width 20 mm. On both sides of the mold in a longitudinal direction two metal plates are mounted as lateral limitations which project 2 mm beyond the upper edge of the triangular cross section. The mold is then dropped three times from a height of 2 cm onto a solid surface. If necessary the mold is then filled up again. The lateral limitations are then removed and the excess substance scraped off. A non-combustible, non-porous and low heat-conducting base plate is placed on top of the mold, the apparatus inverted and the mold removed. The ignition source (flame from a gas burner with a minimum temperature of 1000° C.) is placed at one end until the sample ignite. A preliminary screening test is carried out. If the substance does not ignite and propagate combustion either by burning along 200 mm of the powder train within 2 min test period, the substance should not be classified as flammable solid and no further test is required. If the substance ignite and propagates burning of a 200 mm length of the powder train in less than 2 min the burning rate will be determined. A substance should be classified in Division 4.1 (readily combustible solid) when the time of burning of one or more of the six test runs is less than 45 s or the rate of burning is more than 2.2 mm/s.

Particle Size Distribution and Apparent Powder Density

Particle size measurement was performed on laser instrument (Malvern 3000). A small quantity of powder (around 0.1 gr) is introduced in the measurement cell full with absolute ethanol and submit to ultrasonication treatment for 120 seconds before measurement.

Apparent density of the powder was performed using a dry graduated glass cylinder of 100 cc (readable to 1 cc), half filled with the powder sample gently introduced without compacting. The powder density is given by the ratio between volume and weight.

Compounding and UL-94 Flammability Procedure

All components reported in Example and Comparative Example formulations are extruded in a 24 mm twin screw extruder with a temperature profile in the range depending on the polymer base. The polymer pellets are introduced in the main hopper, a dry blend of additives is introduced in the first side feeder and the glass fibres in the second side feeder.

The extruded polymer pellets are eventually dried in an oven at 90° C. before injection moulding in UL-94 specimens at different thickness (3.2 mm-1.6 mm-0.8 mm) and 5 specimens were conditioned for 24 hours at 23° C. and 50% humidity. Flammability have been reported according to UL-94 procedure. When tests do not meet V0, V1 and V2 an NC classification has been given.

Ingredients

Hypophosphite

Aluminium hypophosphite (Phoslite IP-A by Italmatch Chemicals) with moisture<0.3%, PSD D98<35 microns and apparent density=0.65 gr/cc, hereafter "IP-A"

Calcium hypophosphite (Phoslite IP-C, by Italmatch Chemicals), with moisture<0.3%, PSD D98<35 microns and apparent density=0.45 gr/cc hereafter "IP-C"

Non-flammable inorganic or organic aluminium salt of phosphorus, where P oxidation state is lower than +5:

Aluminium Di Ethyl Phosphinate (Exolit OP1230, by Clariant), hereafter "DEPAL" Aluminium Methyl Methyl Phosphonate, (DQFR-6006 ex Liside Chemicals), hereafter "AMMP"

Neutral Aluminium Phosphite (APA-100 ex Taihei Chemical Industrial Co. Ltd.), hearafter "NAPI"

Fillers and Reinforcing Agents

Talc (Steamic T1CA, by Imerys), a reinforcing filler, hereafter "Talc" Calcium carbonate (Omyalite 90T by Omya), a not reinforcing filler, hereafter "CaCO3"

Glass Fiber (PPG 3786, by PPG), a reinforcing filler, hereafter "GF"

Flame Retardant Agents and Synergics

Melamine cyanurate (Melagard MC25, by Italmatch Chemicals), a nitrogen containing compound, hereafter "MC"

Melamine phosphate (Melagard MP, by Italmatch Chemicals), a phosphorus nitrogen containing compound, hereafter "MP"

Melamine polyphosphate (Melapur 200/70, by BASF), a polymeric phosphorus and nitrogen containing compound, hereafter "MPP"

Magnesium hydroxide (Magnifin H10 by Huber), a metallic hydrate, hereafter "Mg(OH)2"

Aluminium hydroxide (Alcan Superfine Alcan), a metallic hydrate, hereafter "Al(OH)3"

Melamine hydrobromide (Melagard MHB, by Italmatch Chemicals), a ionic halogenated compound, hereafter "MHB"

Tetrabromo bis phenol A bis(2,3-dibromopropyl ether) CAS 21850-44-2, an halogenated aliphatic/aromatic compound, hereafter "PE68"

Decabromodiphenylethane CAS 84852-53-9, an halogenated aromatic compound, hereafter "S8010"

Brominated polystyrene CAS 88497-56-7, an halogenated aromatic polymeric compound, hereafter "BPS"

Brominated epoxy CAS 68928-70-1, an halogenated aromatic polymeric compound, hereafter "BEO"

Brominated polyacrylate CAS 59447-57-3, an halogenated aromatic polymeric compound, hereafter "BPA"

Resorcinol bis (2,6-dixylenyl phosphate) (Daihachi PX200, by Daihachi Chemicals), an organic phosphorus containing compound, hereafter "RDX"

1,6-Hexanediamine, N1,N6-bis(2,2,6,6-tetramethyl-4-piperidinyl)-, polymer with 2,4,6-trichloro-1,3,5-triazine, reaction products with 3-bromo-1-propene, N-butyl-1-butanamine and N-butyl-2,2,6,6-tetramethyl-4-piperidinamine, oxidized, hydrogenated (Tinuvin NOR371, by BASF), an oligomeric nitrogen containing compound, hereafter "NOR371"

Zinc Borate (Firebrake ZB by Borax), a flame retardant synergic, hereafter "ZnB" 2,3-Dimethyl-2,3-diphenylbutane (Perkadox 30 by AkzoNobel), a flame retardant synergic, hereafter "DICUMENE"

Aluminium Phosphate CAS 7784-30-7 by Sigma-Aldrich, a flame retardant synergic, hereafter "APA"

Ethylene Vinyl Alcohol (Soarnol DT 2904 by NIPPON GOHSEI EUROPE), a polymeric synergic, hereafter "EVOH"

Fluorinated copolymer (DYNEON MM3595, by 3M), an anti-dripping additive, hereafter "PTFE"

Polymers

Polypropylene homopolymer (Moplen HP500N), hereafter "PP"

Poly Butylene Terephtalate (Ultradur B4500, by BASF), hereafter "PBT"

Polyamide 6 (Ultramid B 22, by BASF), hereafter "PA6"

Acrylonitryile Butadiene Styrene copolymer (Magnum ABS 3904, by STYRON), hereafter "ABS"

High Impact Polystyrene (Edistir SR 550, by Enichem Versalis), hereafter "HIPS" Polycarbonate (Makrolon 2808, by Bayer), hereafter "PC"

TABLE 1

Powder Flammability Test in presence of Inorganics fillers and Flame retardants Hydrates (comparative examples)

|        | C.1  | C.2 | C.3 | C.4 | C.5 | C.6 | C.7 | C.8 | C.9 | C.10 | C.11 |
|--------|------|-----|-----|-----|-----|-----|-----|-----|-----|------|------|
| IP-A   | 100% | 85% | 50% | 85% | 50% | 85% | 50% | 85% | 50% | 85%  | 50%  |
| Talc   |      | 15% | 50% |     |     |     |     |     |     |      |      |
| CaCO3  |      |     |     | 15% | 50% |     |     |     |     |      |      |
| ZnB    |      |     |     |     |     | 15% | 25% |     |     |      |      |
| Mg(OH)2|      |     |     |     |     |     |     | 15% | 25% |      |      |
| Al(OH)3|      |     |     |     |     |     |     |     |     | 15%  | 25%  |
| Class* | F    | F   | F   | F   | F   | F   | NF  | F   | NF  | F    | NF   |

*F = Flammable; NF = Not Flammable

Comments to Table 1

Comparison of C.2-C.3 and C.4-C.5 to C.1 shows the effect of the addition of a reinforcing filler to Aluminium Hypophosphite powder. Conclusion is that the addition of a reinforcing filler do not decrease powder flammability.

Comparison of C.6-C.7 to C.1 show the effect of the addition of an inorganic flame retardant synergic to Aluminium Hypophosphite powder. Conclusion is that the addition of an inorganic flame retardant do not decrease powder flammability at a concentration below 20%.

Comparison of C.8-C.9 and C.10-C.11 to C.1 show the effect of the addition of inorganic metal hydrates flame retardant to Aluminium Hypophosphite powder. Conclusion is that the addition of inorganic metal hydrates flame retardant do not decrease powder flammability at a concentration below 20%.

TABLE 2

Powder Flammability Test in presence of Nitrogen and Phosphorous containing flame retardants derivative (examples and comparative examples)

|        | C.12 | C.13 | C.14 | C.15 | C.16 | C.17 | E.18 | E.19 | E.20 | E.21 | C.22 |
|--------|------|------|------|------|------|------|------|------|------|------|------|
| IP-A   | 85%  | 85%  | 85%  | 85%  | 90%  | 90%  | 90%  |      | 90%  | 90%  | 90%  |
| IP-C   | —    | —    | —    | —    | —    |      | —    | 90%  |      |      |      |
| MP     | 15%  |      |      |      |      |      |      |      |      |      |      |
| MPP    |      | 15%  |      |      |      |      |      |      |      |      |      |
| MC     |      |      | 15%  |      |      |      |      |      |      |      |      |
| RDX    |      |      |      | 15%  | 10%  |      |      |      |      |      |      |
| NOR 371|      |      |      |      |      | 10%  |      |      |      |      |      |
| OP1230 |      |      |      |      |      |      | 10%  | 10%  |      |      |      |
| AMMP   |      |      |      |      |      |      |      |      |      | 10%  |      |

TABLE 2-continued

Powder Flammability Test in presence of Nitrogen and Phosphorous containing flame retardants derivative (examples and comparative examples)

| | C.12 | C.13 | C.14 | C.15 | C.16 | C.17 | E.18 | E.19 | E.20 | E.21 | C.22 |
|---|---|---|---|---|---|---|---|---|---|---|---|
| NAPI | | | | | | | | | | 10% | |
| APO | | | | | | | | | | | 10% |
| Class * | F | F | F | NF | F | F | NF | NF | NF | NF | F |

* F = Flammable; NF = Not Flammable

Comments to Table 2

Comparison of C.12-C.13-C.14 to C.1 shows the effect of the addition of a phosphorus nitrogen flame retardant to Aluminium Hypophosphite powder. Conclusion is that the addition of a not melting phosphorus nitrogen flame retardant do not decrease powder flammability.

Comparison of C.15-C.16 to C.1 shows the effect of the addition of an organic phosphorus containing flame retardant to Aluminium Hypophosphite powder. Conclusion is that the addition of an organic phosphorus containing flame retardant decrease powder flammability at 15% by weight but not at 10% by weight. Compositions claimed in present invention are indeed more effective than the organic phosphorus containing flame retardant and so are preferred.

Comparison of C.17 to C.1 shows the effect of the addition of an oligomeric nitrogen containing flame retardant to Aluminium Hypophosphite powder. Conclusion is that the addition of an oligomeric nitrogen containing flame retardant does not decrease powder flammability at 10% by weight.

Comparison of examples from E.18 to E.21 to C1 shows that the addition at a very low level (10% by weight) of an of organic phosphinate aluminium salt (oxidation state +1) or an organic phosphonate aluminium salt (oxidation state +3) or an inorganic phosphite aluminium salt to Aluminium Hypophosphite decrease powder flammability.

On the contrary, comparison of C.22 to C.1 show that the addition of an aluminium phosphate salt (oxidation state +5) at 10% by weight to Aluminium Hypophosphite does not affect the powder flammability.

TABLE 3

Powder Flammability Test in presence of Brominated additives with ionic moiety, aliphatic moiety, aromatic moiety with polymeric and monomeric structure (comparative examples)

| | Halogen Moiety | Polymeric/ Monomeric | C.23 | C.24 | C.25 | C.26 | C.27 | C.28 | C.29 | C.30 | C.31 |
|---|---|---|---|---|---|---|---|---|---|---|---|
| IP-A | | | 90% | 90% | 90% | 90% | 80% | 90% | 80% | 90% | 80% |
| MHB | Ionic | Monomeric | 10% | | | | | | | | |
| PE68 | Aliphatic/ aromatic | Monomeric | | 10% | | | | | | | |
| S8010 | Aromatic | Monomeric | | | 10% | | | | | | |
| BPS | Aromatic | Polymeric | | | | 10% | 20% | | | | |
| BEO | Aromatic | Polymeric | | | | | | 10% | 20% | | |
| BPA | Aromatic | Polymeric | | | | | | | | 10% | 20% |
| Class * | | | NF | NF | NF | F | F | F | F | F | F |

* F = Flammable; NF = Not Flammable

Comments to Table 3

Comparison of C.23, C.24 and C.25 to C1 show that the addition of 10% by weight of a monomeric Brominated additives, with ionic or aliphatic or aromatic moiety, reduce flammability of IP-A.

On the contrary, an higher loading (>20% by weight) of a polymeric Brominated additive (comparative examples from C.26 to C.31) is necessary to obtain a not flammable IP-A mixture.

In the Example and Comparative Example formulations, reported in the followings tables (from Table 4 to Table 8), is demonstrated that the same amount of non-flammable IP-A, according to the present invention, instead of flammable IP-A, give the same flame retardant performances, according UL 94 standard, on different polymer formulations.

TABLE 4

Example and Comparative Example of flame retardant formulations on PP base

|  | C.32 | E.33 | C.34 | E.35 | C.36 | E.37 |
|---|---|---|---|---|---|---|
| PP | 96% | 96% | 93.2% | 93.2% | 97.8% | 97.8% |
| IP-A | 2% | — | 6% | — | 2% | — |
| E.18 | — | 2% | — | 6% | — | 2% |
| MHB | 2% | 2% | — | — | — | — |
| PE68 | — | — | — | — | 0.1% | 0.1% |
| NOR 371 | — | — | 0.8% | 0.8% | — | — |
| DICUMENE | — | — | — | — | 0.1% | 0.1% |
| UL-94 3.2 mm | V2 | V2 | V2 | V2 | V2 | V2 |
| UL-94 1.6 mm | V2 | V2 | V2 | V2 | V2 | V2 |

TABLE 5

Example and Comparative Example flame retardant formulations on PBT GF base

|  | C.38 | E.39 | C.40 | E.41 | C.42 | E.43 |
|---|---|---|---|---|---|---|
| PBT | 50% | 50% | 54% | 54% | 55% | 55% |
| GF | 30% | 30% | 30% | 30% | 30% | 30% |
| IP-A | 10% | — | 5% | — | 5% | — |
| E.18 | — | 10% | — | 5% | — | 5% |
| MC | 10% | 10% | — | — | — | — |
| BPA | — | — | 11% | 11% | — | — |
| 8010 | — | — | — | — | 10% | 10% |
| UL-94 3.2 mm | V0 | V0 | V0 | V0 | V0 | V0 |
| UL-94 1.6 mm | V0 | V0 | V0 | V0 | V0 | V0 |
| UL-94 0.8 mm | V2 | V2 | V0 | V0 | V0 | V0 |

TABLE 6

Example and Comparative Example flame retardant formulations on PA base

|  | C.44 | E.45 | C.46 | E.47 |
|---|---|---|---|---|
| PA6 | 51% | 51% | 48% | 48% |
| GF | 30% | 30% | 30% | 30% |
| IP-A | 11% | — | 11% | — |
| E.18 | — | 11% | — | 11% |
| MC | 8% | 8% | 8% | 8% |
| EVOH | — | — | 3% | 3% |
| UL-94 3.2 mm | V0 | V0 | V0 | V0 |
| UL-94 1.6 mm | V0 | V0 | V0 | V0 |
| UL-94 0.8 mm | V2 | V2 | V0 | V0 |

TABLE 7

Example and Comparative Example of flame retardant formulations on HIPS base

|  | C.48 | E.49 | C.50 | E.51 | C.52 | E.53 |
|---|---|---|---|---|---|---|
| HIPS | 64.7% | 64.7% | 78.8% | 78.8% | 75.8% | 75.8% |
| IP-A | 24.5% | — | 5% | — | 6% | — |
| E.18 | — | 24.5% | — | 5% | — | 6% |
| PX200 | 10.5% | 10.5% | — | — | — | — |
| 8010 | — | — | 15% | 15% | — | — |
| FR245 | — | — | — | — | 18% | 18% |
| PTFE | 0.3% | 0.3% | 0.2% | 0.2% | 0.2% | 0.2% |
| UL-94 1.6 mm | V0 | V0 | V0 | V0 | V0 | V0 |

TABLE 8

Example and Comparative Example of flame retardant formulations on PC base

|  | C.54 | E.55 | C.56 | E.57 |
|---|---|---|---|---|
| PC | 92% | 92% | 94.7% | 94.7% |
| IP-C | 8% | — | 5% | — |
| E.19 | — | 8% | — | 5% |
| PTFE | — | — | 0.3% | 0.3% |
| UL-94 1.6 mm | V0 | V0 | V0 | V0 |

The invention claimed is:

1. A non-flammable hypophosphite composition in powder form consisting of:
   a) Aluminium or Calcium hypophosphite
   b) a non-flammable inorganic or organic aluminium salt of phosphorus where phosphorous oxidation state is lower than +5 or a mixture thereof, said non-flammable inorganic or organic aluminium salt of phosphorous being selected from the group consisting of aluminium diethyl phophinate, aluminium methyl methyl phosphonate and neutral aluminium phosphite
   wherein
   a) said Aluminium or Calcium hypophosphite concentration is 90% by weight,
   b) said non-flammable inorganic or organic aluminium salt of phosphorus concentration is 10% by weight.

2. A process for the preparation of the composition of claim 1, wherein components a) and b) are separately milled in powder form and subsequently added in a slow mechanical mixer or in a high-speed mechanical mixer.

3. A process for the preparation of the composition of claim 1, wherein components a) and b) are mixed before grinding.

* * * * *